(12) United States Patent
Kim et al.

(10) Patent No.: US 7,714,964 B2
(45) Date of Patent: May 11, 2010

(54) TRANSFLECTIVE LIQUID CRYSTAL DISPLAY

(75) Inventors: Jae-Hyun Kim, Suwon-si (KR);
Jun-Young Lee, Yongin-si (KR);
Sung-Wook Kang, Seoul (KR)

(73) Assignee: Samsung Electronics Co., Ltd. (KR)

(*) Notice: Subject to any disclaimer, the term of this patent is extended or adjusted under 35 U.S.C. 154(b) by 276 days.

(21) Appl. No.: 11/565,121

(22) Filed: Nov. 30, 2006

(65) Prior Publication Data
US 2007/0126957 A1  Jun. 7, 2007

(30) Foreign Application Priority Data
Dec. 6, 2005  (KR) ............ 10-2005-0117986

(51) Int. Cl.
*G02F 1/1335* (2006.01)
*G02F 1/1343* (2006.01)
(52) U.S. Cl. ........................................ 349/114
(58) Field of Classification Search .............. None
See application file for complete search history.

(56) References Cited

U.S. PATENT DOCUMENTS

| | | | |
|---|---|---|---|
| 5,418,635 A * | 5/1995 | Mitsui et al. ............ | 349/113 |
| 5,684,551 A * | 11/1997 | Nakamura et al. ........ | 349/99 |
| 5,805,252 A * | 9/1998 | Shimada et al. .......... | 349/113 |
| 6,233,031 B1 * | 5/2001 | Ishitaka .................. | 349/113 |
| 6,400,437 B1 | 6/2002 | Nagata et al. | |
| 6,473,145 B1 * | 10/2002 | Shim et al. ............. | 349/113 |
| 7,391,488 B2 * | 6/2008 | Fujishiro et al. ........ | 349/113 |
| 2003/0128329 A1 * | 7/2003 | Kim ....................... | 349/187 |
| 2004/0196422 A1 | 10/2004 | Arai et al. | |
| 2004/0233359 A1 * | 11/2004 | Nam et al. .............. | 349/114 |

FOREIGN PATENT DOCUMENTS

| | | |
|---|---|---|
| JP | 2003-255323 | 9/2003 |
| JP | 2003-279965 | 10/2003 |
| JP | 2003-344838 | 12/2003 |
| JP | 2004-325528 | 11/2004 |
| JP | 2005-084644 | 3/2005 |
| KR | 1020040110834 | 12/2004 |
| KR | 1020050056121 | 6/2005 |
| KR | 1020050067257 | 7/2005 |
| KR | 1020050070471 | 7/2005 |

* cited by examiner

*Primary Examiner*—Tina M Wong
(74) *Attorney, Agent, or Firm*—Cantor Colburn LLP

(57) ABSTRACT

A transflective LCD having a transmissive area and a reflective area according to an exemplary embodiment of the present invention includes a first substrate, a plurality of pixel electrodes formed on the first substrate and including a plurality of reflective electrodes having protrusion patterns and depression patterns, a second substrate facing the first substrate, a plurality of color filters formed on the second substrate and having a light hole in the reflective area, and a common electrode formed on the color filters. The size of the protrusion patterns in a first reflective area having the light hole is different from that in a second reflective area having no light hole, and the size of the protrusion patterns at the center of the first reflective area may be larger than that in the second reflective area.

25 Claims, 7 Drawing Sheets

TRANSFLECTIVE LIQUID CRYSTAL DISPLAY

This application claims priority to Korean Patent Application No. 10-2005-0117986, filed on Dec. 06, 2005, and all the benefits accruing therefrom under 35 U.S.C. §119, the entire contents of which in its entirety are herein incorporated by reference.

BACKGROUND OF THE INVENTION (a) Field of the Invention

The present invention relates to a transflective liquid crystal display and a manufacturing method thereof.

(b) Description of the Related Art

Liquid crystal displays ("LCDs") are one of the most widely used flat panel displays. An LCD includes a liquid crystal ("LC") layer interposed between two panels, each panel provided with field-generating electrodes. The LCD displays images by applying voltages to the field-generating electrodes to generate an electric field in the LC layer which determines orientations of LC molecules of the LC layer to adjust polarization of incident light. The light having adjusted polarization is either intercepted or allowed to pass by a polarizing film, thereby displaying images.

LCDs are categorized as non-emissive displays, in that they do not produce any form of light. Accordingly, the LCDs utilize artificial light emitted from lamps of a backlight unit separately provided, or ambient light, as a light source. Depending on the light sources employed by the LCD, LCDs are classified as a transmissive LCD or a reflective LCD. The light source of the transmissive LCD includes a backlight, and the light source of the reflective LCD includes an external light. The reflective type of LCD is usually applied to a small or mid-size display device. Recently, transflective LCDs have been under development. The transflective LCD uses both a backlight and an external light as light sources depending on circumstances, and are usually applied to small or mid-size display devices.

The transflective LCD includes a transmissive region and a reflective region in a pixel. While light passes through an LC layer only once in the transmissive region, light passes through the LC layer twice in the reflective region. Accordingly, a difference of color tone between the transmission areas and the reflection areas may occur.

There are two methods to solve the above-mentioned problem. The first method is to form the color filters of the transmission areas to be thicker than the color filters of the reflection areas. The second method is to form light holes in the color filters of the reflection areas.

However, the latter method has some drawbacks. In this latter method, after the formation of the holes, an overcoat layer is coated on all of the color filters in order to compensate a stage difference between the color filters with the holes and the color filters without the holes, thus creating a planarized surface. In this case, however, perfect planarization is technically impossible. Accordingly, even if the overcoat layer is formed on all of the color filters, a cell gap at the reflection area with the holes and a cell gap at reflection area without the holes are different from each other. This difference in cell gaps at the reflection area causes a yellowish display.

BRIEF SUMMARY OF THE INVENTION

A transflective liquid crystal display having a transmissive area and a reflective area according to an exemplary embodiment of the present invention includes a first substrate, a plurality of pixel electrodes formed on the first substrate and including a plurality of reflective electrodes having protrusion patterns and depression patterns, a second substrate facing the first substrate, a plurality of color filters formed on the second substrate and having a light hole formed in the reflective area, and a common electrode formed on the color filters. The size of the protrusion patterns in a first reflective area having the light hole is different from that in a second reflective area which is absent a light hole.

The size of the protrusion patterns at the center of the first reflective area may be larger than that in the second reflective area.

The size of the protrusion patterns is largest at the center of the first reflective area and may become smaller moving away from the center of the first reflective area.

The size of the protrusion patterns in the first reflective area and that in the second reflective area may be the same.

Cell gaps of the first reflective area may be substantially the same as cell gaps of the second reflective area.

The plurality of color filters may include a plurality of red filters, a plurality of green filters, and a plurality of blue filters, the light hole in the green filter may be largest, and the light hole in the blue filter may be smallest, wherein a size of the light hole is defined by a width thereof.

The size of the protrusion pattern located in a region corresponding to the center of the light hole may be largest in the green filter and may be smallest in the blue filter.

The light hole may have a rectangular shape or a circular shape.

The reflective electrode may be formed in the reflective area.

A transflective liquid crystal display having a transmissive area and a reflective area according to another exemplary embodiment of the present invention includes a first substrate; a plurality of gate lines and data lines formed on the first substrate; a plurality of thin film transistors each connected to a respective gate and data line of the gate lines and data lines; a passivation layer formed on the first substrate; an organic insulating layer formed on the passivation layer; a plurality of pixel electrodes each connected to a respective thin film transistor, each pixel electrode formed on the organic insulating layer and including a transmissive electrode and a reflective electrode; a second substrate facing the first substrate; and a plurality of color filters formed on the second substrate and having a light hole in the reflective area. The organic insulating layer and the reflective electrode have protrusion patterns and depression patterns, and the size of the protrusion patterns in a first reflective area having the light hole is different from that in a second reflective area having no light hole.

The size of the protrusion patterns at the center of the first reflective area may be larger than that in the second reflective area.

The size of the protrusion patterns is largest at the center of the first reflective area and may become smaller moving away from the center of the first reflective area.

The size of the protrusion patterns in the first reflective area and that in the second reflective area may be uniform.

The plurality of color filters may include a plurality of red filters, a plurality of green filters, and a plurality of blue filters, the light hole in the green filter may be he largest, and the light hole in the blue filter may be smallest, wherein a size of the light hole is defined by a width thereof.

The size of the protrusion pattern located in a region corresponding to the center of the light hole may be largest in the green filter and may be smallest in the blue filter.

The light hole may have a rectangular shape or a circular shape.

The transmissive electrode may be formed in the transmissive region and the reflective region, the reflective electrode may be formed in the reflective region, and the reflective electrode may be disposed on the transmissive electrode.

The organic insulating layer may have a transmitting window exposing a portion of the passivation layer.

The LCD may further include a plurality of light blocking members formed on the second substrate and a common electrode formed on the light blocking members and the color filters.

Cell gaps of the first reflective area may be substantially the same as cell gaps of the second reflective area.

BRIEF DESCRIPTION OF THE DRAWINGS

The above and/or other aspects, features and advantages of the present invention will become apparent and more readily appreciated from the following description of the exemplary embodiments, taken in conjunction with the accompanying drawings of which.

DETAILED DESCRIPTION OF THE INVENTION

Figure 1:
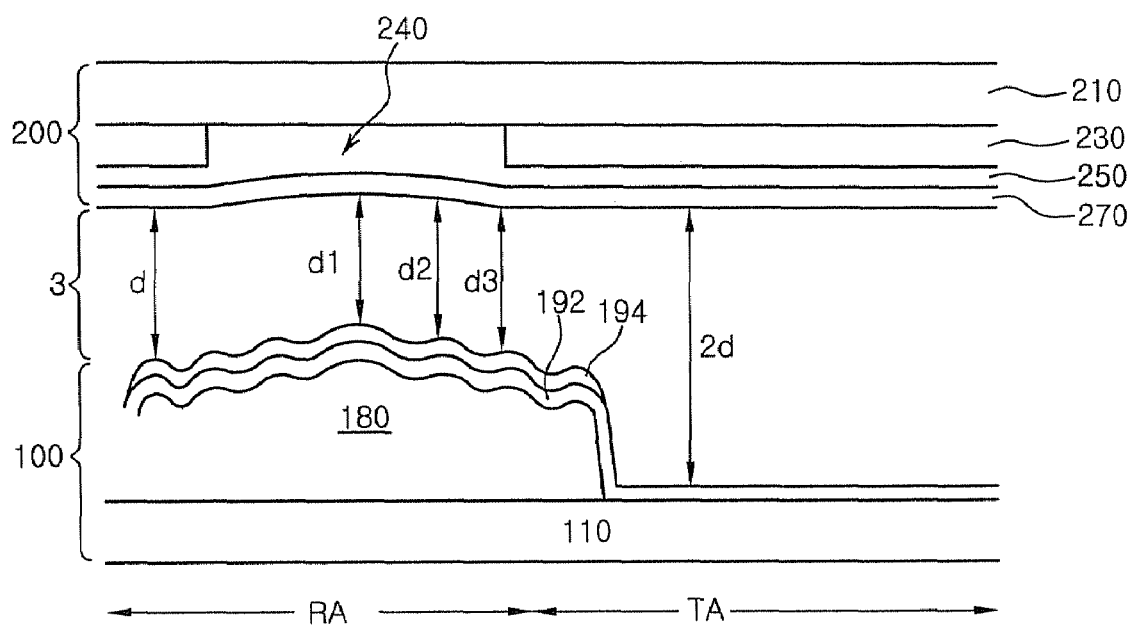
FIG. 1 a schematic cross-sectional view of an exemplary embodiment of LCD according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Now, an LCD according to an exemplary embodiment of the present invention will be described in more detail with reference to the accompanying drawings.

FIG. 1 is a schematic cross-sectional view of an exemplary embodiment of an LCD according to the present invention.

As shown in FIG. 1, the LCD includes a TFT array panel 100, a common electrode panel 200 facing the TFT array panel 100, and an LC layer 3 interposed therebetween.

The TFT array panel 100 includes an insulation substrate 110, a plurality of switching elements (not shown) and a organic insulating layer 180 formed on the insulation substrate 110 and pixel electrodes 191 formed on the organic insulating layer 180. Each pixel electrode 191 includes a transmissive electrode 192 and a reflective electrode 194 disposed on a portion of the transmissive electrode 192. The organic insulating layer 180 has an embossed surface. Each reflective electrode 194 is curved along the embossed surface of the organic insulating layer 180 having protrusion patterns and depression patterns. The protrusion patterns and depression patterns of the reflective electrode 194 enhance reflective efficiency.

The common electrode panel 200 includes an insulation substrate 210, and color filters 230 and a common electrode 270 formed on the insulation substrate 210.

The transflective LCD liquid crystal display includes a transmissive area TA and a reflective area RA defined by the transmissive electrode 192 and the reflective electrode 194, respectively. In more detail, areas disposed under and over an exposed portion of a transmissive electrode 192 are transmissive regions TA, and areas disposed under and over a reflective electrode 194 are reflective regions RA. In the transmissive regions TA, light from a backlight unit (not shown) disposed under the TFT array panel 100 passes through the LC layer 3 to display desired images. In the reflective regions RA, external light such as sunlight or ambient light which is incident thereon passes through the common electrode panel 200 and through the LC layer 3 to reach the reflective electrodes 194. Then, the external light is reflected by the reflective electrodes 194 and passes through the LC layer 3 again, to display desired images.

The color filters 230 of the reflective regions RA include a plurality of light holes 240.

A size of the protrusion patterns of the reflective electrode 194 varies depending on the portion of the reflective regions RA. The size of the protrusion patterns is larger in the reflective regions RA having the light holes 240 than that in other portions of the reflective regions RA, and the size is largest in a portion corresponding to a center of the light hole 240. The size of protrusion patterns of the reflective electrode 194 varies depending on portions of the reflective regions RA such that a thickness of the LC layer 3, e.g., the cell gap d1, d2, d3 at the reflective region RA with the light holes 240 are the same as a cell gap d at the reflective region RA without the light holes 240. Accordingly, a difference in size of the cell gaps at the reflective region RA with the light holes 240 and the reflective region RA without the light holes 240 may be compensated by a difference in the size of the protrusion patterns of the reflective electrode 194 to maintain constant cell gaps in an entire reflective region RA.

Now, the structures of an exemplary embodiment of an LCD according to the present invention will be described with reference to FIGS. 2 to 4.

Figure 2:
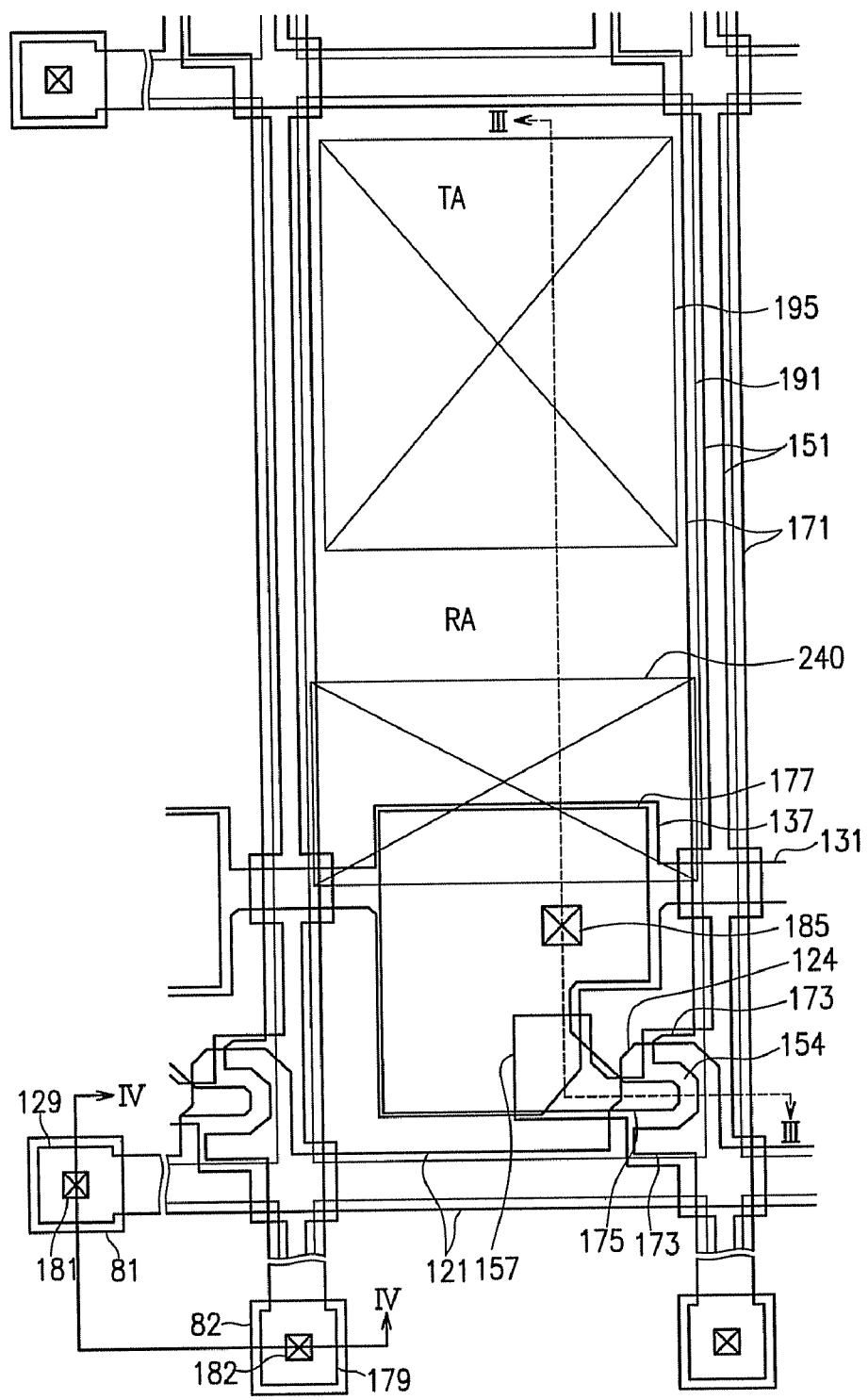
FIG. 2 is a plan view layout of an exemplary embodiment of an LCD according to the present invention.

FIG. 2 is a plan view layout of an exemplary embodiment of an LCD according to the present invention. FIGS. 3 and 4 are cross-sectional views of the TFT array panel shown in FIG. 2 taken along line II-II' and line IV-IV', respectively.

An exemplary embodiment of an LCD according to the present invention includes a TFT array panel 100, a common electrode panel 200 facing the TFT array panel 100 and an LC layer 3 interposed therebetween.

First, the TFT array panel 100 will be described.

A plurality of gate lines 121 and a plurality of storage electrode lines 131 are formed on an insulating substrate 110 made of a material such as transparent glass or plastic, for example, but is not limited thereto.

The gate lines 121 transmit gate signals and extend substantially in a horizontal direction as illustrated in FIG. 2.

Each of the gate lines 121 includes a plurality of gate electrodes 124 projecting upward therefrom, and an end portion 129 having a large area for contact with another layer or an external driving circuit (not shown). A gate driving circuit (not shown) for generating the gate signals may be mounted on a flexible printed circuit ("FPC") film (not shown), which may be attached to the substrate 110, directly mounted on the substrate 110, or integrated with the substrate 110. The gate lines 121 may extend to be connected to a driving circuit (not shown) which may be integrated with the substrate 110.

The storage electrode lines 131 are supplied with a predetermined voltage and extend substantially parallel to the gate lines 121. Each of the storage electrode lines 131 is disposed between two adjacent gate lines 121, and is disposed closer to the lower of the two adjacent gate lines 121. Each of the storage electrode lines 131 includes a storage electrode 133 expanding upward and downward therefrom, as illustrated in FIG. 2. However, the storage electrode lines 131 may have various shapes and arrangements.

In exemplary embodiments, the gate lines 121 and the storage electrode lines 131 are made of an Al-containing metal such as Al or an Al alloy, a Ag-containing metal such as Ag or a Ag alloy, a Cu-containing metal such as Cu or a Cu alloy, a Mo-containing metal such as Mo or a Mo alloy, or metals such as Cr, Ta or Ti. However, they may have a multi-layered structure including two conductive films (not shown) having different physical characteristics. One of the two films is may be preferably made of a low resistivity metal including an Al-containing metal, a Ag-containing metal, and a Cu-containing metal for reducing signal delay or voltage drop. The other film may be preferably made of a material such as a Mo-containing metal, Cr, Ta, or Ti, which has good physical, chemical, and electrical contact characteristics with other materials such as indium tin oxide ("ITO") or indium zinc oxide ("IZO"). Good examples of the combination of the two films are a lower Cr film and an upper Al (alloy) film and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110. The inclination angles thereof range from about 30 degrees to about 80 degrees.

A gate insulating layer 140 preferably made of silicon nitride ("SiNx") or silicon oxide ("SiOx") is formed on the gate lines 121 and the storage electrode lines 131.

A plurality of semiconductor stripes 151 desirably made of hydrogenated amorphous silicon (abbreviated to "a-Si") or polysilicon are formed on the gate insulating layer 140. Each of the semiconductor stripes 151 extends substantially in the longitudinal direction and includes a plurality of projections 154 branched out toward the gate electrodes 124 and a plurality of projections 157 branched out toward the storage electrode 137 from the projections 154, as illustrated in FIG. 2. The semiconductor stripes 151 become wide near the gate lines 121 and the storage electrode lines 131 such that the semiconductor stripes 151 cover large areas of the gate lines 121 and the storage electrode lines 131.

A plurality of ohmic contact stripes and islands 161 and 165, respectively, are formed on the semiconductor stripes 151. The ohmic contact stripes and islands 161 and 165 are desirably made of n+ hydrogenated a-Si heavily doped with an n-type impurity such as phosphorous, or they may be made of silicide. Each ohmic contact stripe 161 includes a plurality of projections 163. The projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110. The inclination angles thereof are desirably in a range of about 30 degrees to about 80 degrees.

Figure 3:
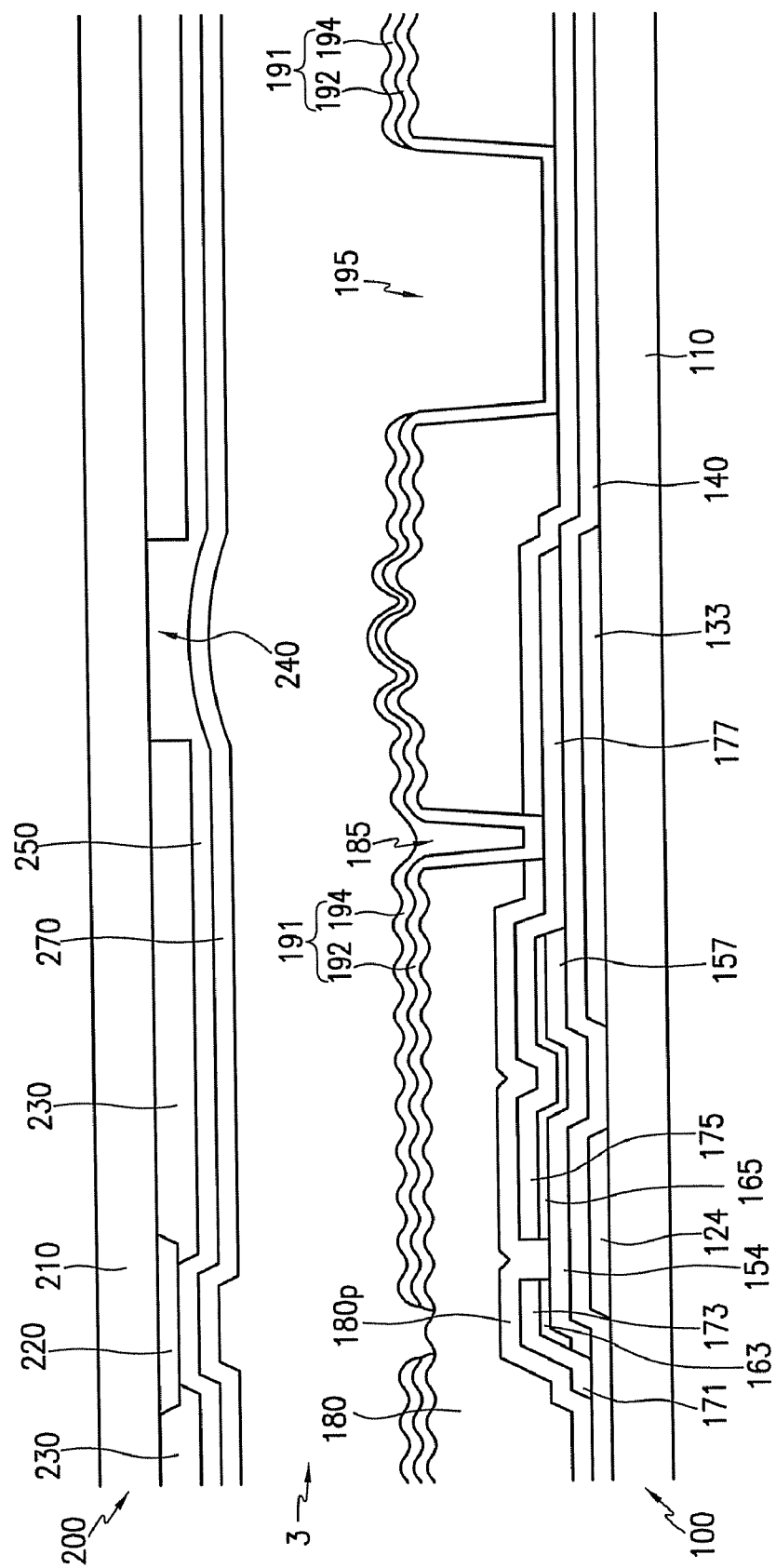
FIG. 3 and FIG. 4 are cross-sectional views of a TFT array panel shown in FIG. 2 taken along line III-III' and line IV-IV', respectively.
Figure 4:
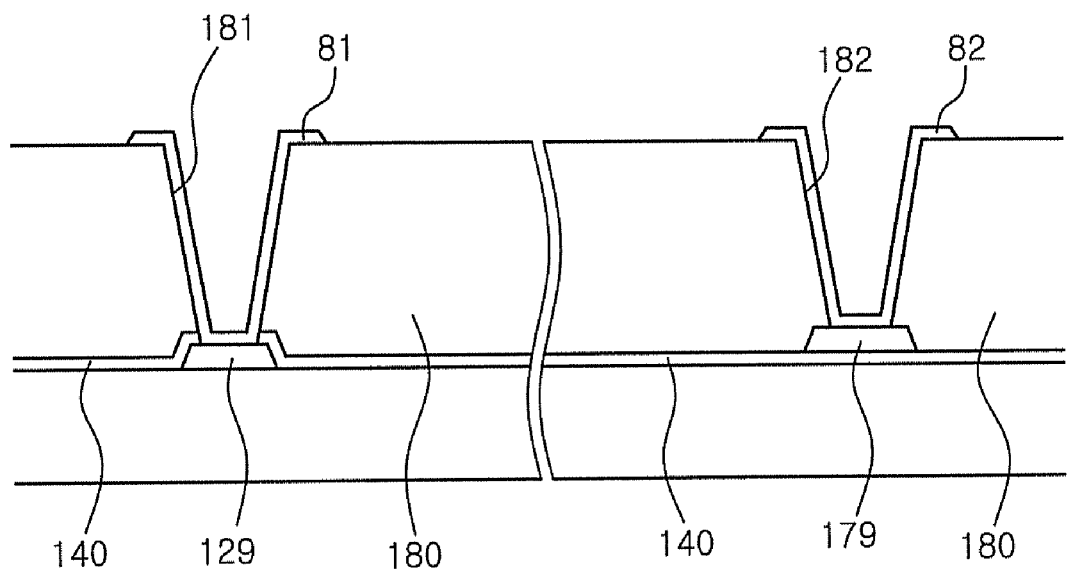

A plurality of data lines 171 and a plurality of drain electrodes 175 are formed on the ohmic contacts 161 and 165, respectively, and on the gate insulating layer 140, as illustrated in FIG. 3.

The data lines 171 transmit data signals and extend substantially in the longitudinal direction to intersect the gate lines 121 and the storage electrode lines 131, as illustrated in FIG. 2. Each data line 171 includes a plurality of source electrodes 173 projecting toward the gate electrodes 124, and an end portion 179 having a large area for contact with another layer or an external driving circuit (not shown). A data driving circuit (not shown) for generating the data signals may be mounted on an FPC film (not shown), which may be attached to the substrate 110, directly mounted on the substrate 110, or integrated with the substrate 110. The data lines 171 may extend to be connected to a driving circuit which may be integrated with the substrate 110.

The drain electrodes 175 are separated from the data lines 171 and are disposed opposite of the source electrodes 173 with respect to the gate electrodes 124. Each of the drain electrodes 175 includes a wide end portion 177 and a narrow end portion. The wide end portion 177 overlaps a storage electrode 137 of a storage electrode line 131, and the narrow end portion is partly enclosed by a source electrode 173.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

In exemplary embodiments, the data lines 171 and the drain electrodes 175 are made of a refractory metal such as Cr, Mo, Ta, Ti, or alloys comprising at least one of the foregoing metals. However, they may have a multilayered structure including a refractory metal film (not shown) and a low resistivity film (not shown). Good examples of the multi-layered structure are a double-layered structure including a lower Cr/Mo (alloy) film and an upper Al (alloy) film, and a triple-layered structure of a lower Mo (alloy) film, an intermediate Al (alloy) film and an upper Mo (alloy) film. However, the data lines 171 and the drain electrodes 175 may be made of various metals or conductors.

The data lines 171 and the drain electrodes 175 have inclined edge profiles. The inclination angles thereof range from about 30 degrees to about 80 degrees.

The ohmic contacts 161 and 165 are interposed only between the underlying semiconductor stripes 151 and the overlying conductors of the data lines and drain electrodes 171 and 175 thereon, and reduce the contact resistance therebetween. Although the semiconductor stripes 151 are narrower than the data lines 171 at most locations, the width of the semiconductor stripes 151 becomes large near the gate lines 121 and the storage electrode lines 131 as described above, to smooth the profile of the surface, thereby preventing disconnection from the data lines 171. The semiconductor stripes 151 include some exposed portions which are not covered with the data lines 171 and the drain electrodes 175 such as portions located between the source electrodes 173 and the drain electrodes 175.

A passivation layer 180p is formed on the data lines 171, the drain electrodes 175, and the exposed portions of the semiconductor stripes 151. An organic insulating layer 180 is formed on the passivation layer 180p. The passivation layer 180p is desirably made of an inorganic insulator such as silicon nitride or silicon oxide, and the organic insulating layer 180 is desirably made of an organic insulator. In exemplary embodiments, the organic insulating layer 180 may have a dielectric constant of less than about 4.0 and photo-sensitivity. The organic insulating layer 180 has an embossed surface. A size of protrusion patterns of the embossed surface varies depending on locations thereof. The organic insulating layer 180 has an opening exposing a partial portion of the passivation layer 180p to be a transmitting window 195. However, at least one of the passivation layer 180p and the organic insulating layer 180 may be omitted.

The passivation layer 180p and the organic insulating layer 180 has a plurality of contact holes 182 and 185 exposing the end portions 179 of the data lines 171 and the drain electrodes 175, respectively. The passivation layer 180p, the organic insulating layer 180 and the gate insulating layer 140 have a plurality of contact holes 181 exposing the end portions 129 of the gate lines 121, as illustrated in FIG. 4.

A plurality of pixel electrodes 191 and a plurality of contact assistants 81 and 82 are formed on the passivation layer 180p or the organic insulating layer 180.

Each of the pixel electrodes 191 is curved along the embossed surface of the organic insulating layer 180, and includes a transmissive electrode 192 and a reflective electrode 194 thereon. The transmissive electrodes 192 are desirably made of a transparent conductor such as ITO or IZO, and the reflective electrodes 194 are preferably made of reflective metals such as Ag, Al, Cr, or alloys thereof (e.g., alloys comprising at least one of the foregoing reflective metals). However, the reflective electrode 194 may have a double-layered structure including a reflective upper film of a low-resistivity material such as Al, Ag, or alloys thereof, and a lower film having a good contact characteristic with ITO or IZO such as a Mo-containing metal, Cr, Ta, and Ti, for example, but not limited thereto.

The reflective electrode 194 is disposed on a portion of the transmissive electrode 192, and thereby the remaining portion of the transmissive electrode 192 is exposed. The exposed transmissive electrode 192 is disposed in a region corresponding to the transmitting window 195.

The pixel electrodes 191 are physically and electrically connected to the drain electrodes 175 through the contact holes 185 such that the pixel electrodes 191 receive data voltages from the drain electrodes 175. The pixel electrodes 191 supplied with the data voltages generate electric fields in cooperation with a common electrode 270 of the common electrode panel 200 which is supplied with a common voltage, which in turn determine the orientations of LC molecules (not shown) of an LC layer 3 disposed between the two electrodes 191 and 270 to adjust polarization of the incident light passing through the LC layer 3.

A pixel electrode 191 and the common electrode 270 form a capacitor referred to as a "liquid crystal capacitor," which stores applied voltages after the TFT turns off.

A transflective LCD including the TFT array panel 100, the common electrode panel 200 and the LC layer 3 according to an exemplary embodiment of the present invention includes a plurality of transmissive regions TA and a plurality of reflective regions RA defined by the transmissive electrodes 192 and the reflective electrodes 194, respectively. In more detail, areas disposed under and over the transmitting window 195 are the transmissive regions TA.

In the transmissive regions TA, light from a backlight unit (not shown) disposed under the TFT array panel 100 passes through the LC layer 3 to display desired images. In the reflective regions RA, external light such as sunlight or ambient light which is incident thereon passes through the common electrode panel 200 and through the LC layer 3 to reach the reflective electrodes 194. Then, the external light is reflected by the reflective electrodes 194 and passes through the LC layer 3 again, to display desired images. At this time, the embossed surface of the reflective electrode 194 enhances reflective efficiency.

The organic insulating layer 180 is eliminated in the transmissive regions TA such that a cell gap in the transmissive regions TA is larger than a cell gap in the reflective regions RA. The cell gap in transmissive regions TA is twice as large as the cell gap in the reflective regions RA.

A pixel electrode 191 and a wide end portion 177 of a drain electrode 175 overlap a storage electrode 133 to form an additional capacitor referred to as a "storage capacitor," which enhances the voltage storing capacity of the liquid crystal capacitor.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices (not shown).

A description of the common electrode panel 200 is described hereinbelow as follows with reference to FIG. 3.

A light blocking member 220 is formed on an insulating substrate 210 made of a material, such as transparent glass or plastic, for example, but is not limited thereto. The light blocking member 220 is referred to as a black matrix, and it prevents light leakage. The light blocking member 200 has a plurality of aperture regions facing the pixel electrodes 191.

A plurality of color filters 230 are also formed on the substrate 210, and they are formed substantially within the aperture regions enclosed by the light blocking member 220. The color filters 230 may extend substantially in the longitudinal direction along the pixel electrodes 191. The color filters 230 may represent one of the primary colors such as red, green and blue colors, for example, but is not limited thereto.

The color filters 230 of the reflective regions RA include a plurality of light holes 240 to compensate for a difference in color tone between the reflective regions RA and the transmissive regions TA due to the number of times the light rays are transmitted through the color filters 230. The size of the light hole 240 (e.g., its width) may be largest in the green color filter 230 and may be smallest in the blue color filter 230. Here, the size of the light hole 240 is defined by the width thereof.

An overcoat layer 250, made of an organic material, is formed on the light-blocking member 220 and the color filters 230 to protect the color filters 230. However, the overcoat layer 250 may be omitted in alternative exemplary embodiments.

Meanwhile, the size of the protrusion patterns of the reflective electrode 194 is larger in the reflective regions RA having the light holes 240 than that in other reflective regions RA, and the size is largest in a portion corresponding to a center of the light hole 240. The size of the protrusion patterns (e.g., a height of the protrusions of the protrusion pattern) of the reflective electrode 194 varies depending on portions of the reflective regions RA such that the cell gaps of the LC layer 3 in the reflective regions RA are substantially equal to each other regardless of the light holes 240.

A common electrode 270 is formed on the overcoat 250. The common electrode 270 is desirably made of a transparent conductive material, such as ITO or IZO, in exemplary embodiments.

Now, the protrusion patterns and depression patterns of the organic insulating layer 180 inducing the protrusion patterns and depression patterns of the reflective electrode 194 will be described in more detail with reference to FIGS. 5A, 5B, 6A and 6B.

Figure 5A:
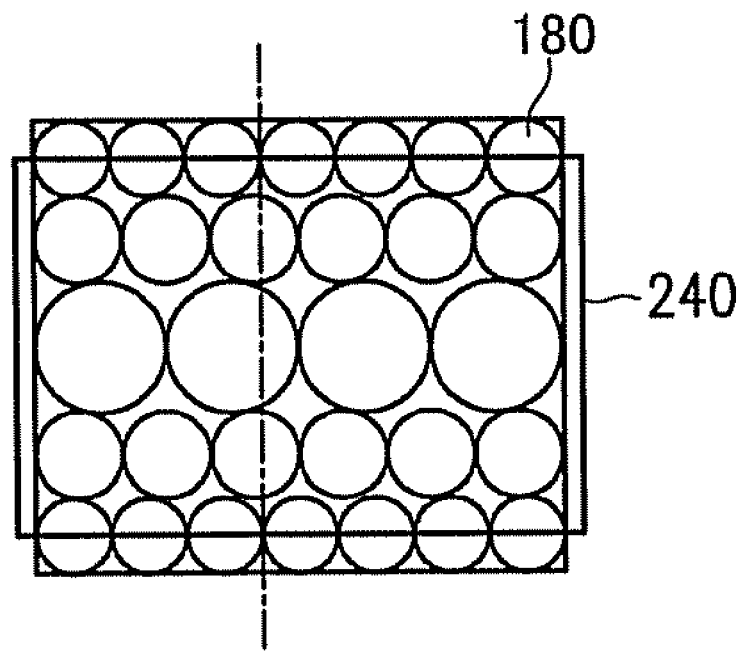
FIGS. 5A, 5B, 6A and 6B show examples of an embossed surface in a reflective region of an exemplary embodiment of an LCD according to the present invention.
Figure 5B:
Figure 6A:
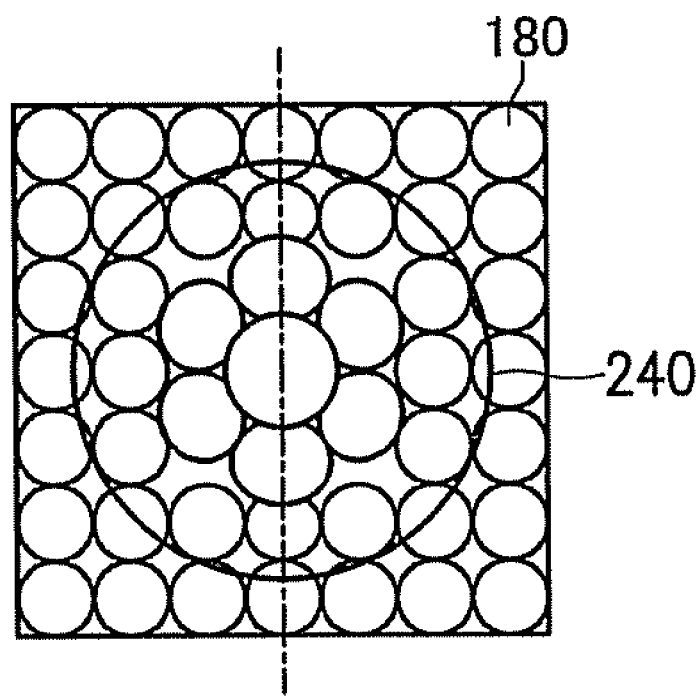
Figure 6B:

FIGS. 5A, 5B, 6A and 6B show examples of an embossed surface of the organic insulating layer 180 in a reflective region of a liquid crystal display according to an exemplary embodiment of the present invention. In FIGS. 5A and 6A, schematic plan view layouts of the protrusion patterns and depression patterns are shown. FIGS. 5B and 6B illustrate schematic cross-sectional views of the organic insulating layer 180 facing the light hole 240 are shown in the lower side, respectively.

As shown in FIG. 5A, the light hole 240 has a rectangular shape, and the size of the protrusion patterns is largest at a center portion above and below the light hole 240. The size is smaller as the patterns are disposed further from the center of the light hole 240.

In the exemplary embodiment shown in FIGS. 5A and 5B, the light hole 240 has a rectangular form becoming longer in a horizontal direction such that the size (e.g., a diameter thereof of the protrusion patterns becomes smaller from the center line in a horizontal direction. If the light hole 240 has a rectangular form becoming longer in a vertical direction, the size of the protrusion patterns becomes smaller from the center line in a vertical direction. The stage difference between the color filter 230 with the light hole 240 and the color filter 230 without the light hole 240 is largest at the center of the light hole 240 to be compensated by the protrusion patterns as described above. Accordingly, uniform cell gap may be obtained between the color filter 230 with the light hole 240 and the color filter 230 without the light hole 240.

Referring to FIGS. 6A and 6B, the light hole 240 has a circular shape, the size of the protrusion patterns is largest in the center of the light hole 240, and the size becomes smaller from the center to the circumference of the light hole 240. Accordingly, a uniform cell gap may be obtained between the color filter 230 with the light hole 240 and the color filter 230 without the light hole 240.

The light hole 240 may be largest in a green color filter 230 and may be smallest in a blue color filter 230. Accordingly, the size of the protrusion patterns may be relatively large in a green color filter 230 and may be relatively small in a blue color filter 230. The stage difference in color filters depending on the size difference of the light hole 240 is compensated to obtain uniform cell gaps.

Figure 7A:
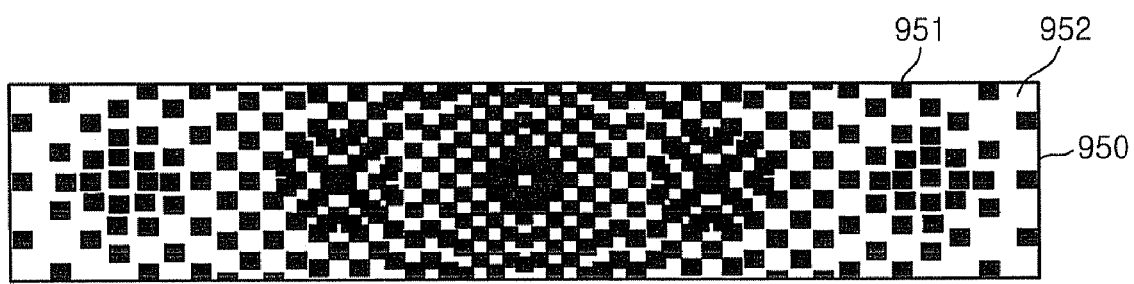
FIG. 7A is a plan view layout of an exemplary embodiment of a mask used in an exemplary embodiment of the present invention and FIG. 7B is a cross-section view of an example of an embossed surface made using the mask of FIG. 7A.
Figure 7B:

Next, a manufacturing method of the protrusion patterns and depression patterns of the organic insulating layer 180 is described in more detail with reference to FIGS. 7A and 7B. FIG. 7A is a plan view layout of a mask used in an exemplary embodiment of the present invention and FIG. 7B illustrates an example of an embossed surface made using the mask of FIG. 7A.

The embossed surface having the protrusion patterns and depression patterns of the organic insulating layer 180 is made using photolithography. An example of a mask used in photolithography is shown in FIG. 7, and an example of the protrusion patterns and depression patterns formed using the mask of FIG. 7A is shown in FIG. 7B.

Referring to FIG. 7A, a mask 950 includes light-blocking portions 951 and light-transmitting portions 952. To form the two kinds of portions in the mask, an opaque material, such as Cr, an emulsion, an oxidized metal, or silicon, is partially formed on a quartz substrate. As a result, opaque regions with the Cr, emulsion, oxidized metal, or silicon become the light-blocking portions 951, and the remaining regions without the opaque material become the light-transmitting portions 952.

The light-transmitting portions 952 are more sparsely provided moving closer to the center where the size of the protrusion patterns is relatively large. They are more densely provided from the center to the peripheral region where the size of the protrusion patterns is relatively small. The area of the light-transmitting portions 952 becomes larger from the center to the peripheral region.

The organic insulating layer 180 is exposed to light using the mask 950 such that the amount of light entering the photosensitive organic insulating layer 180 varies depending on the incident position. The incident amount decreases as the incident position of the light becomes closer to a central portion of the mask 950 such that the photosensitive organic insulating layer 180 is slightly removed moving closer to a central portion of the mask 950 where the size of the protrusion patterns is relatively large if the organic insulating layer 180 has positive photosensitivity.

If the organic insulating layer 180 has negative photosensitivity, the light-blocking portions 951 and light-transmitting portions 952 of the mask 950 are exchanged with each other.

As described above, the size of protrusion patterns of the reflective electrode 194 is larger in the reflective regions RA having the light holes 240 than that in the reflective regions RA without the light holes 240, and the size is largest in a portion corresponding to a center of the light hole 240. Accordingly, the cell gaps of the LC layer 3 in the reflective regions RA are substantially equal to each other regardless of the presence of light holes 240 in the reflective regions RA to prevent a yellowish image.

While the present invention has been described in connection with what is presently considered to be practical exemplary embodiments, it is to be understood that the present invention is not limited to the disclosed exemplary embodiments, but, on the contrary, is intended to cover various modifications and equivalent arrangements included within the spirit and scope of the appended claims.

What is claimed is:

1. A transflective liquid crystal display having a transmissive area and a reflective area, the liquid crystal display comprising:
   a first substrate;
   a plurality of pixel electrodes formed on the first substrate and including a plurality of reflective electrodes having protrusion patterns and depression patterns;
   a second substrate facing the first substrate;
   a plurality of color filters formed on the second substrate and having a light hole in the reflective area; and
   a common electrode formed on the color filters,
   wherein a height of the protrusion patterns measured from the first substrate in a first reflective area having the light hole is different from that in a second reflective area without a light hole, and
   wherein the size of the protrusion patterns is largest at the center portion of the light hole and the size of the protrusion patterns is smaller as the patterns are disposed further from the center of the light hole.

2. The liquid crystal display of claim 1, wherein the height of the protrusion patterns at the center of the first reflective area is larger than that in the second reflective area.

3. The liquid crystal display of claim 2, wherein the height of the protrusion patterns is largest at the center of the first reflective area and becomes smaller moving away from the center of the first reflective area.

4. The liquid crystal display of claim 2, wherein the height of the protrusion patterns in the second reflective area are uniform.

5. The liquid crystal display of claim 1, wherein cell gaps of the first reflective area are substantially the same as cell gaps of the second reflective area.

6. The liquid crystal display of claim 2, wherein the plurality of color filters comprise a plurality of red filters, a plurality of green filters, and a plurality of blue filters, the light hole in the green filter is largest, and the light hole in the blue filter is smallest.

7. The liquid crystal display of claim 6, wherein the size of the light hole is defined by a width thereof 8. The liquid crystal display of claim 6, wherein the height of the protrusion pattern located in a region corresponding to the center of the light hole is largest in the green filter and is smallest in the blue filter.

9. The liquid crystal display of claim 8, wherein the light hole has a rectangular shape or a circular shape.

10. The liquid crystal display of claim 1, wherein the reflective electrode is formed in the reflective area.

11. A transflective liquid crystal display having a transmissive area and a reflective area, the liquid crystal display comprising:
    a first substrate;
    a plurality of pixel electrodes formed on the first substrate and including a plurality of reflective electrodes having protrusion patterns and depression patterns;
    a second substrate facing the first substrate;
    a plurality of color filters formed on the second substrate and having a light hole in the reflective area; and
    a common electrode formed on the color filters,
    wherein a height of the protrusion patterns form the first substrate in a first reflective area having the light hole is larger than that in a second reflective area without a light hole, and wherein the size of the protrusion patterns is largest at the center portion of the light hole and the size of the protrusion patterns is smaller as the patterns are disposed further from the center of the light hole.

12. The liquid crystal display of claim 11, wherein the height of the protrusion patterns is largest at the center of the first reflective area and becomes smaller moving away from the center of the first reflective area.

13. The LCD of claim 11, wherein the height of the protrusion patterns in the second reflective area are uniform.

14. The LCD of claim 11, wherein cell gaps of the first reflective area are substantially the same as cell gaps of the second reflective area.

15. A transflective liquid crystal display having a transmissive area and a reflective area, the liquid crystal display comprising:
    a first substrate;
    a plurality of gate lines and data lines formed on the first substrate;
    a plurality of thin film transistors each connected to a respective gate line and data line;
    a passivation layer formed on the first substrate;
    an organic insulating layer formed on the passivation layer;
    a plurality of pixel electrodes connected to the thin film transistors and formed on the organic insulating layer, each pixel electrode including a transmissive electrode and a reflective electrode;
    a second substrate facing the first substrate; and
    a plurality of color filters formed on the second substrate and having a light hole in the reflective area,
        wherein the organic insulating layer and the reflective electrode have protrusion patterns and depression patterns, and wherein the height of the protrusion patterns form the first substrate in a first reflective area having the light hole is different from that in a second reflective area without a light hole, and wherein the size of the protrusion, patterns is lamest at the center portion of the light hole and the size of the protrusion patterns is smaller as the patterns are disposed further from the center of the light hole.

16. The LCD of claim 15, wherein the height of the protrusion patterns at the center of the first reflective area is larger than that in the second reflective area.

17. The LCD of claim 16, wherein the height of the protrusion patterns is largest at the center of the first reflective area and becomes smaller moving away from the center of the first reflective area.

18. The LCD of claim 16, wherein the height of the protrusion patterns in the first reflective area and that in the second reflective area are uniform.

19. The LCD of claim 16, wherein the plurality of color filters comprise a plurality of red filters, a plurality of green filters, and a plurality of blue filters, the light hole in the green filter is largest, and the light hole in the blue filter is smallest.

20. The LCD of claim 19, wherein the height of the protrusion pattern located in a region corresponding to the center of the light hole is largest in the green filter and is smallest in the blue filter.

21. The LCD of claim 19, wherein the light hole has a rectangular shape or a circular shape.

22. The LCD of claim of claim 15, wherein the transmissive electrode is formed in the transmissive region and the reflective region, the reflective electrode is formed in the reflective region, and the reflective electrode is disposed on the transmissive electrode.

23. The LCD of claim of claim 16, wherein the organic insulating layer has a transmitting window exposing a portion of the passivation layer.

24. The LCD of claim of claim 16, further comprising:
a plurality of light blocking members formed on the second substrate; and
a common electrode formed on the light blocking members and the color filters.

25. The LCD of claim of claim 15, wherein cell gaps of the first reflective area are substantially the same as cell gaps of the second reflective area.

* * * * *